(12) United States Patent
Saumer

(10) Patent No.: US 10,114,345 B2
(45) Date of Patent: Oct. 30, 2018

(54) SAFETY CONTROL FOR THE SECURE OPERATION OF A TECHNICAL PLANT AND METHOD OF OPERATING A SAFETY CONTROL

(71) Applicant: SICK AG, Waldkirch (DE)

(72) Inventor: Markus Saumer, Waldkirch (DE)

(73) Assignee: SICK AG, Waldkirch (DE)

( * ) Notice: Subject to any disclaimer, the term of this patent is extended or adjusted under 35 U.S.C. 154(b) by 369 days.

(21) Appl. No.: 14/679,591

(22) Filed: Apr. 6, 2015

(65) Prior Publication Data

US 2015/0309481 A1    Oct. 29, 2015

(30) Foreign Application Priority Data

Apr. 25, 2014   (EP) .................................... 14166081

(51) Int. Cl.
*G06F 19/00*    (2018.01)
*G05B 9/02*    (2006.01)

(52) U.S. Cl.
CPC ..................... *G05B 9/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,370,718 A | * | 1/1983 | Chasek | G08G 1/08 340/911 |
| 5,196,158 A | * | 3/1993 | Partington | G21C 7/36 376/216 |
| 6,172,432 B1 | * | 1/2001 | Schnackenberg | H02J 3/14 307/125 |
| 6,465,908 B1 | * | 10/2002 | Karuppana | B60Q 1/28 307/10.1 |

(Continued)

FOREIGN PATENT DOCUMENTS

CN    1784640 A    6/2006

OTHER PUBLICATIONS

European Search Report dated Oct. 8, 2014 corresponding to application No. 14166081.1-1802.

(Continued)

*Primary Examiner* — Kidest Bahta
(74) *Attorney, Agent, or Firm* — Nath, Goldberg & Meyer; Jerald L. Meyer

(57) ABSTRACT

In order to reduce the power-loss in digital inputs of a safety control, a safety control for the secure operation of a technical plant is provided that comprises at least one input unit for the reception of a signal of at least one signal generator connected to the technical plant, a control unit for the reading in of the received signal and for generating a control command, and at least one output unit for the transmission of the generated control command to at least one connected actuator of the technical plant, wherein the (Continued)

Figure 1:
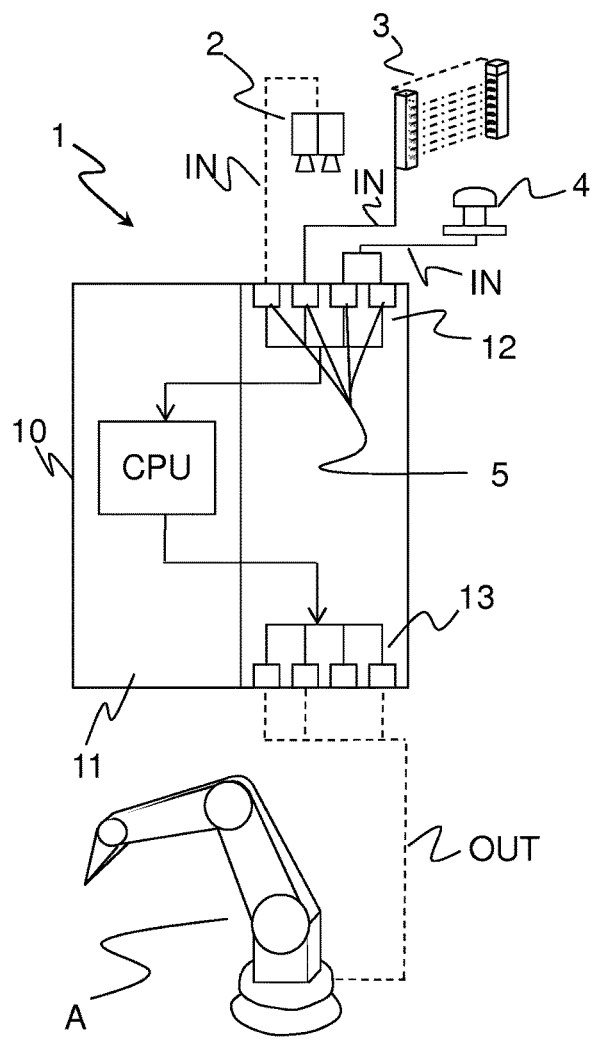

input unit has a switching element at the input side that can be controlled by means of the control unit and is configured in such a way that the switching element can be actuated by means of the control unit directly prior to the reading in of the received signal, in particular can be closed, and can be actuated again by means of the control unit, in particular opened, following the reading in of the received signal.

12 Claims, 2 Drawing Sheets

(56) References Cited

U.S. PATENT DOCUMENTS

| | | | | |
|---|---|---|---|---|
| 6,633,823 | B2* | 10/2003 | Bartone | H02J 3/14 |
| | | | | 700/295 |
| 6,842,745 | B2* | 1/2005 | Occhipinti | H04L 27/001 |
| | | | | 327/94 |
| 7,076,311 | B2* | 7/2006 | Schuster | G05B 9/02 |
| | | | | 361/1 |
| 7,149,655 | B2* | 12/2006 | Frederick | G05B 19/042 |
| | | | | 702/182 |
| 7,551,028 | B1* | 6/2009 | Cyrusian | H03F 3/217 |
| | | | | 330/10 |
| 9,218,233 | B2* | 12/2015 | Venditti | G06F 11/008 |
| 2003/0139820 | A1* | 7/2003 | Nagatsuka | G05B 19/042 |
| | | | | 700/9 |
| 2004/0075343 | A1* | 4/2004 | Wareham | H02J 3/14 |
| | | | | 307/39 |
| 2005/0063114 | A1* | 3/2005 | Suhara | G05B 9/03 |
| | | | | 361/62 |
| 2006/0190101 | A1 | 8/2006 | Seizinger | |
| 2007/0083275 | A1* | 4/2007 | Law | G05B 19/41855 |
| | | | | 700/19 |
| 2007/0090649 | A1* | 4/2007 | Moore | H02K 99/10 |
| | | | | 290/2 |
| 2007/0182255 | A1* | 8/2007 | Schneiderheinze | G05B 9/02 |
| | | | | 307/125 |
| 2008/0082184 | A1* | 4/2008 | Murakami | G05B 19/0425 |
| | | | | 700/79 |
| 2008/0157883 | A1* | 7/2008 | Li | H03B 21/025 |
| | | | | 331/37 |
| 2009/0281711 | A1 | 11/2009 | Ueno | |
| 2009/0315229 | A1* | 12/2009 | Tomasic | C21B 7/24 |
| | | | | 266/44 |

OTHER PUBLICATIONS

"Manual—multifunction safety switching device samos" (Handbuch—Multifunktions-Sicherheitsschaltgerat Modulares elektronisches Sicherheitssystem), Wieland Electric GmbH, Dec. 2005; statement of relevance contained in translation of the reply to the opposition in EP procedure dated Nov. 10, 2017.

Part of a circuit diagram of a "SAMOS base module" of the company Schleicher Electronic GmbH & Co., KG, dated Sep. 12, 2006; relevance contained in translation of the reply to the opposition in EP procedure dated Nov. 10, 2017; additional statement of relevance from applicant.

Automation technology of the company Wieland Electric GmbH, May 2005; relevance contained in translation of the reply to the opposition in EP procedure dated Nov. 10, 2017.

Invoices showing sales; relevance contained in translation of the reply to the opposition in EP procedure dated Nov. 10, 2017.

Excerpt of a technical standard of the VDE (German Association for Electrical, Electronic & Information Technologies; statement of relevance from applicant.

"BGIA—Report Functional Safety of Machinery Controls", Feb. 2008, statement of relevance contained in translation of the reply to the opposition in EP procedure dated Nov. 10, 2017.

Automation technology of the company Wieland Electric GmbH, May 2005; relevance contained in translation of be reply to the opposition in EP procedure dated Nov. 10, 2017.

Invoices showing sales; relevance contained in translation of the reply to the opposition in EP procedure dated Nov. 10, 2017; additional statement of relevance from applicant.

Translation of the reply to the opposition in EP procedure, by Sick Sensor Intelligence, Nov. 10, 2017.

Statement of relevance for references E2, E4 and E5 by the applicant.

* cited by examiner

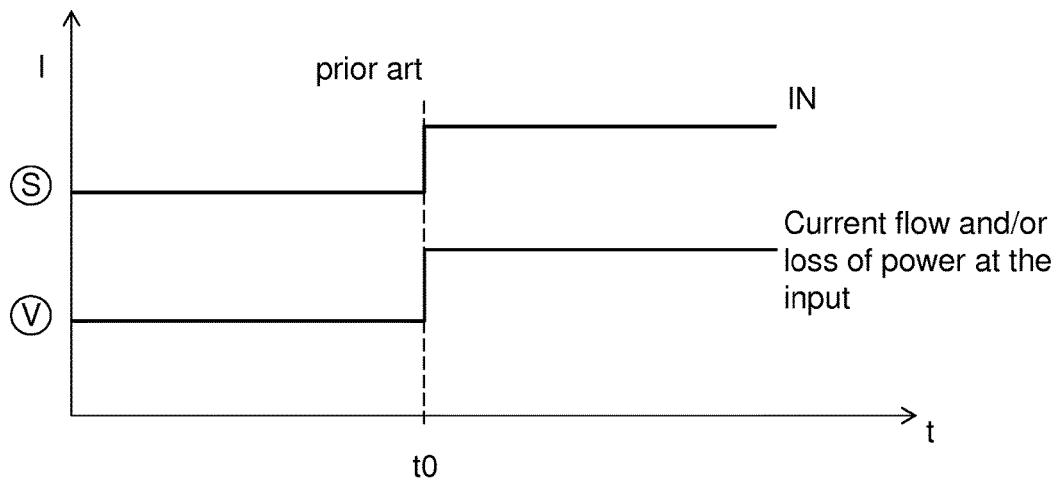
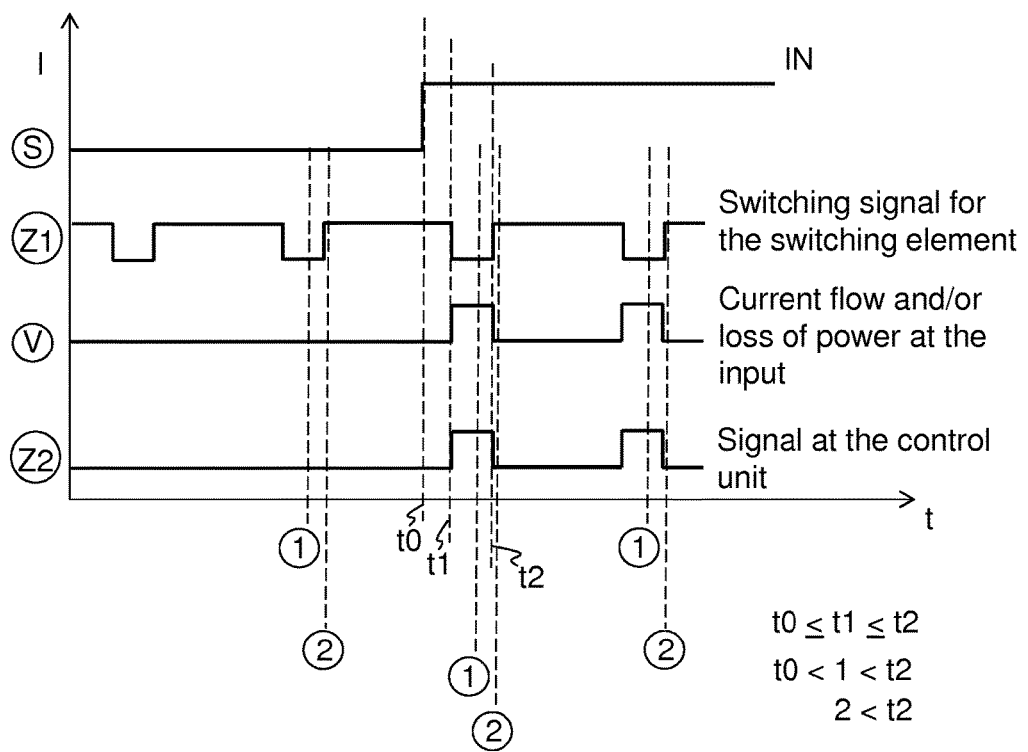

SAFETY CONTROL FOR THE SECURE OPERATION OF A TECHNICAL PLANT AND METHOD OF OPERATING A SAFETY CONTROL

The invention relates to a safety control for the secure operation of a technical plant and to a method of operating a safety control.

The degree of automatization of a technical plant is continuously increasing in today's industry, with a requirement on a secure operation of the automated technical plant likewise being assumed to be higher. The safety requirement is, for example, described in the norm EN ISO 13849-1, the norm IEC 62061 or the like.

The technical plant is essentially composed of at least one actuator that carries out the automated works, at least one signal generator, preferably a secure sensor that monitors the actuator and a safety control that connects the actuator to the signal generator and correspondingly controls the actuator by means of the signals of the signal generator and a process program.

In this respect the signal generator is connected to at least one input and the actuator is connected to at least one output of the safety control.

The signals of the signal generator are supplied to the at least one input of the safety control for further processing and/or evaluation, in such a way that the input of the safety control represents itself as a current sink.

During the increased automatization, the number of the used signal generators is likewise increased such that an increased packing density of signal generators at the inputs of the safety control leads to a non-negligible loss of power due to a current at the inputs of the safety control.

For this reason it is an object of the invention to improve a safety control for the secure operation of a technical plant in such a way that a reduction of the loss of power at the inputs of the safety control can be achieved. It is a further object of the present invention to make available a method for the operation of the safety control in such a way that the safety control works in an energy-saving manner.

The object is satisfied in accordance with the invention by a safety control for the secure operation of a technical plant comprising at least one input unit for the receiving a signal of at least one connected signal generator of the technical plant, a control unit for reading in the received signal and for generating a control command and at least one output unit for transmitting the generated control command to at least one connected actuator of the technical plant, wherein the input unit has a switching element at the input side that can be controlled by means of the control unit and is configured in such a way that the switching element can be actuated by means of the control unit directly prior to the reading in of the received signal, in particular can be closed and can be actuated, in particular opened, again by the control unit after the reading in of the received signal.

This has the advantage that a loss of power only arises at the input of the safety control then when the switching element is closed so that the signal of the signal generator is read in. Following the reading in of the signal of the signal generator the loss of power is voided by the opening of the switching element.

In accordance with a preferred embodiment the switching element can be controlled periodically, in particular at intervals discrete in time by means of the control unit. Hereby a possible transient effect of the signal of the signal generator has to be completed by the switching of the switching element by means of the control unit on the reading in.

In accordance with a further preferred embodiment the switching element is an electronic or electromechanical switch.

Furthermore, in accordance with a preferred embodiment the signal generator is an optoelectronic sensor, an emergency cutoff switch or the like.

In accordance with a further preferred embodiment the control unit is configured to determine a state of the input unit from the closing and opening of the switching element. In this respect the control unit recognizes a state of error of the switching element and/or of the input unit if, following the closing and/or opening of the switching element, e.g. a signal level, a status pin or the like does not vary, in particular from high to low and/or vice versa.

The above-mentioned object is further satisfied in accordance with the invention by a method for operating a safety control having at least one input unit for receiving a signal of at least one connected signal generator of a technical plant, a control unit for the reading in of the received signal and for generating a control command and at least one output unit for transmitting the generated control command to at least one connected actuator of the technical plant, wherein the signal of the signal generator is transmitted to the input unit and the control unit actuates a switching element arranged at the input side of the input unit in particular closes this, in such a way that the signal is read in and the switching element is actuated again thereafter, in particular is opened, such that the input unit is separated from the signal generator.

In accordance with a preferred embodiment the switching element closes and/or opens periodically, in particular at intervals discrete in time.

In accordance with a further preferred embodiment the control unit compares a state of the switching element on closing and opening and therefrom determines a secure error-free operating willingness of a switching element and/or of the input unit. Hereby advantageously an error of the switching element and/or of the input unit is determined after the closing and/or opening of the switching element through the control unit if, albeit a closing and/or opening of the switching element, a signal level, a status pin or the like is maintained in an unchanged manner.

The apparatus in accordance with the invention and/or the method in accordance with the invention can be configured in a similar manner by further features and in this respect shows similar advantages. Such further features are described by way of example, but not conclusively, in the dependent claims adjoining the independent claims.

Figure 2:
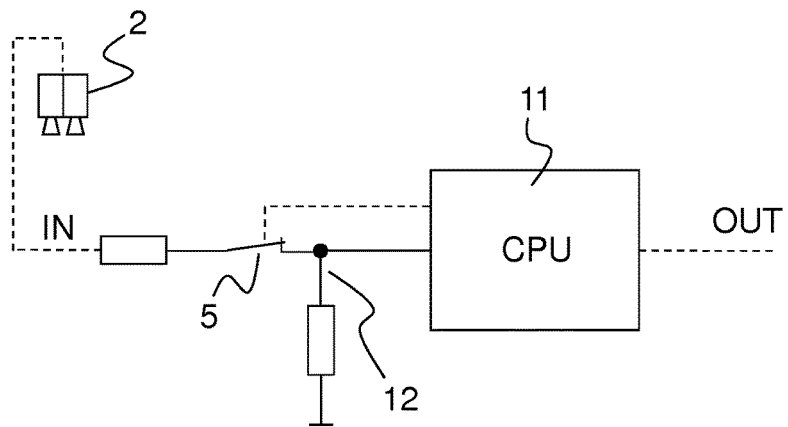

The invention will be described in the following also with regard to further advantages and features with reference to the submitted drawing by means of embodiments. The Figures of the drawing show in:

FIG. 1 a schematic illustration of a technical automatization plant;

FIG. 2 a schematic detailed illustration of the input of the safety control in accordance with the invention;

FIG. 3 a schematic diagram of a common association between a signal of the signal generator and a current flow and/or a current loss of power at the input of the safety control;

FIG. 4 a schematic diagram of an association in accordance with the invention between the signal of the signal generator and the current flow and/or of the loss of power of the input of the safety control in accordance with the invention.

FIG. 1 shows a schematic illustration of a technical automatization plant 1 that has a robot arm as an actuator A for carrying out automated processes. The actuator A is monitored by means of at least one signal generator 2, 3, 4 on the carrying out of its work.

Hereby the signal generator 2, 3, 4 is an optoelectronic sensor, an emergency cutoff switch or the like. In the shown embodiment the actuator A is monitored by a camera 2, a light grid 3 and an emergency cutoff switch 4.

The signal generator 2, 3, 4 and the actuator A are connected to one another via a safety control 10 for the secure operation of the technical plant 1, wherein the signal generator 2, 3, 4 is connected at least to an input unit 12 of the safety control 10 and the actuator A is connected to at least one output unit 13 of the safety control 10.

The input unit 12 of the safety control 10 is provided for receiving a signal IN from the connected signal generator 2, 3, 4 of the technical plant 1.

The output unit 13 is provided for the transmission of a generated control command OUT to the connected actuator A of the technical plant 1.

Hereby the safety control 10 comprises a control unit 11 that is provided for the reading in of the signal IN received from the input unit 12 and for generating the control command OUT transmitted to the actuator A.

Thus the technical plant 1 is securely operated in accordance with the safety norms EN ISO 13849-1, IEC 62061 or the like by means of the safety control 10, in that the signal generators 2, 3, 4 transmits safety directed signals IN with respect to the actuator A to the input unit 12 of the safety control 12. The safety directed signals IN are forwarded by the input unit 12 of the safety control 10 to the control unit 11 of the safety control 10 such that the control unit 11 of the safety control 10 generates corresponding control commands OUT and transmits these to the output unit 13 of the safety control 10. The output unit 13 of the safety control 10 transmits the control commands OUT to the actuator A of the technical plant 1 such that this is moved in accordance with the control commands OUT.

In accordance with the invention the input unit 12 has a switching element 5 at the input side such that the signal generator 2, 3, 4 is connected via the switching element 5 to the input unit 12.

The switching element 5 can be controlled by means of the control unit 11 of the safety control 10.

A schematic detailed illustration of such a design in accordance with the invention of the input of the safety control 10 is illustrated in FIG. 2.

Hereby the signal generator is connected by way of example in the form of the camera 2 to the switching element 5 that is arranged at the input side of the input unit 12 of the safety control 10 and is connected to the control unit 11 by means of the input unit 12 of the safety control 10. The switching element 5 is an electronic or an electromechanical switch that can be controlled by means of the control unit 11 of the safety control 10.

In accordance with the arrangement, the signal generator and/or the camera 2 transmits the detected signal IN to the input unit 12 of the safety control 10.

In accordance with the common state of the art without the switching element 5 in accordance with the invention of the input 12 of the safety control 10, as shown in FIG. 3, the signal IN of the signal generator 2, as illustrated in the curve S, from a point of time t0 brings about a current flow and/or a loss of power, as illustrated in the curve V, at the input unit 12 of the safety control 10, as this acts as a current sink. The loss of power exists for so long as of the point in time t0 as the signal IN of the signal generator 2, 3, 4 is present at the input of the safety control 10.

Having regard to an ever more complex secure technical plant 1, this means to a more intensive monitoring due to the higher number of signal generators 2, 3, 4, a higher integral loss of power results at the input of the safety control 10.

In order to achieve a reduction of the said loss of power an illustration in time of the operation of the safety control 10 in accordance with the invention with the switching element 5 of the input unit 12 is illustrated in FIG. 4.

In the FIG. 4, like in FIG. 3 the intensity I of the parameters is applied over the time t.

In the curve S the intensity of the signal IN of the signal generator 2, 3, 4 is illustrated again, with the intensity changing from a value zero to a value unequal to zero from the point in time t0. That means that from the point in time t0 the signal generator 2, 3, 4 makes available a signal to the input unit 12 of the safety control 10.

In the curve Z1 the control of the control unit 11 of the safety control 10 to the switching element 5 of the input unit 12 is illustrated having regard to which the switching element 5 is periodically controlled or controllable by means of the control unit 11 of the safety control 10, in particular at intervals discrete in time.

Hereby the switching element 5 of the input unit 12, as shown in the curve Z1, is repeatedly actuated by a switching signal through the control unit 11 of the safety control 10.

Before the point in time t0 no change in the input unit 12 and/or in the safety control 10 can be determined per se, albeit the switching signals (curve Z1 at t<t0) of the control unit 11 to the switching element 5.

From the point in time t0 onwards and at the point in time t1, with t1 being larger than t0, the switching signal of the control units 11 brings about an actuation, in particular a closure, of the switching element 5 following the making available of the signal IN of the signal generator 2, 3, 4 at the safety control 10 such that the connection between the signal generator 2, 3, 4 and the input unit 12 is produced and/or closed.

From this a current flow and/or a loss of power results at the input unit 12 of the safety control 10, with the signal IN of the signal generator 2, 3, 4 being able to be read in from the point in time t1 for the control unit 11 of the safety control 10—as indicated in the curve V.

This means that the switching element 5 of the input unit 12 is and/or can be actuated directly prior to the reading in of the signals received and made available by the signal generator 2, 3, 4 from the control unit 11, in particular can be closed and/or actuated, in particular closed-curve Z2 at the point in time t1.

Following a predefined period in time and actuated at the point in time t2, the control unit 11 of the safety control 10 in particular opens the switching element 5 of the input unit 12 again such that the connection between the signal generator 2, 3, 4 and the input unit 12 is interrupted and/or will be interrupted-curve Z1 at the point in time t2.

Hereby the current flow at the input unit 12 of the safety control 10 is terminated, with the loss of power being inhibited at the input of the safety control 10—curve V at the point in time t2.

Thus, in contrast to the common state of the art a significant reduction of the loss of power can be achieved at the input of the safety control 10, albeit a presence of the signal IN of the signal generator 2, 3, 4 by means of an actuation of the switching element 5 of the input unit 12.

The saved loss of power advantageously makes available energy such that the switching of the switching element 5 of the input unit 12 can be carried out at larger currents and/or at higher current values without a higher consumption. This additionally enables the advantage of an improvement with regard to a free operation and/or robustness of the input unit 12.

Furthermore, at the point in time (1) which lies between the point in time t1 and t2 the reading in of the signal IN of the signal generator 2, 3, 4 is started by means of the control unit 11 of the safety control 10. The signal IN read in at this point in time (1) is processed by the control unit 11 such that a control command OUT is generated and can be transmitted via the output unit 13 to the actuator A.

Through the reading in of the signal IN of the signal generator 2, 3, 4 at the point in time (1) it is ensured that a possible transient effect of the signal IN and of the switching signal for the switching element 5 of the input unit 12, as is shown in the curve Z1 of the FIG. 4, can have no negative influence on the evaluation. This means it is ensured that a possible transient effect is terminated on the reading in of the signal IN.

Following the renewed actuation, in particular the opening, of the switching element 5 of the input unit 12 at the point in time t2, the control unit 11 is configured to read in a signal level, a status pin or the like of the connection between the signal generator 2, 3, 4 and the input unit 12 of the safety control 12 at the point in time (2). It is hereby determined by the control unit 11 whether the connection between the signal generator 2, 3, 4 and the input unit 12 of the safety control 10 or of the switching element 5 of the input 12 is error-free by means of the signal level, of the status pin or of the like.

This means that at the point in time (2) the control unit 11 determined whether through the actuation of the switching element 5, the signal level, the status pin or the like has changed or not by means of the curve V of the current flow and/or of the loss of power or of the curve Z2.

If, albeit the actuation of the switching element 5 by means of the control unit 11 of the safety control 10 no change results in the curves V and/or Z2 after the point in time t2, the control unit 11 of the safety control 10 recognizes that the connection between the signal generator 2, 3, 4 and the input unit 12 of the safety control 10 or of the switching element 5 of the input unit 12 itself does not function in an orderly manner then a case of error is present.

Thus, by means of a feedback of the state of the switching element 5 directly after the actuation of the same a secure error-free operating willingness of the switching element 5 of the input unit 12 and of the input unit 12 per se can be determined.

LIST OF REFERENCE NUMERALS

1 technical plant
2 signal generator (camera)
3 signal generator (light grid)
4 signal generator (emergency cutoff switch)
5 switching element
10 safety control
11 control unit
12 input unit
13 output unit
A actuator
IN signal of the signal generator
OUT control command
t0, t1, t2 point in time
(1), (2) reading in point in time

What is claimed is:

1. A safety control for the secure operation of a technical plant, comprising:
   at least one input unit which receives a signal of at least one connected signal generator of the technical plant;
   a control unit, comprising a CPU, for reading in the received signal and for generating a control command; and
   at least one output unit which transmits the generated control command to at least one connected actuator of the technical plant,
   wherein the input unit has a switching element at an input side thereof, the switching element connecting the at least one connected signal generator of the technical plant to the control unit, the switching element being periodically controlled at intervals discrete in time by means of the control unit and is configured in such a way that the switching element is actuated by means of the control unit by closing directly prior to the reading in of the received signal and actuated again by the control unit by opening after the reading in of the received signal, the at least one input unit receiving the signal of the at least one connected signal generator of the technical plant via the switching element at the input side of the at least one input unit.

2. The safety control in accordance with claim 1, wherein the switching element is closed by the control unit directly prior to the reading in of the received signal and is opened by the control unit after the reading in of the received signal.

3. The safety control in accordance with claim 1, wherein the switching element is one of an electronic switch and an electromechanical switch.

4. The safety control in accordance with claim 1, wherein the signal generator is an optoelectronic sensor, or an emergency cutoff function.

5. The safety control in accordance with claim 1, wherein the control unit is configured to determine a state of the input unit from an actuation of the switching element.

6. The safety control in accordance with claim 5, wherein the actuation of the switching element comprises closing and opening.

7. A method of operating a safety control having at least one input unit which receives a signal of at least one connected signal generator of a technical plant, a control unit for reading in the received signal and for generating a control command and at least one output unit which transmits the generated control command to at least one connected actuator of the technical plant, wherein the method comprises the steps of:
   transmitting the signal of the signal generator to the input unit and actuating a switching element arranged at the input side of the input unit to close the switching element at periodic intervals discrete in time to close the switching element at periodic intervals discrete in time to read in the signal; and
   actuating the switching element again thereafter to open the switching element, to separate the input unit from the signal generator, the switching element connecting the at least one connected signal generator of the technical plant to the control unit, the at least one input unit receiving the signal of the at least one connected signal generator of the technical plant via the switching element at the input side of the at least one input unit.

8. The method in accordance with claim 7, wherein the switching element arranged at the input side of the input unit is closed such that the signal is read in and opened again thereafter such that the input unit is separated from the signal generator.

9. The method in accordance with claim 7, wherein the switching element is periodically actuated by the control unit.

10. The method in accordance with claim 7, wherein the switching element is closed and opened by the control unit at intervals discrete in time.

11. The method in accordance with claim 7, wherein the control unit compares a state of the switching element on closing and opening and therefrom determines a secure error-free operating readiness of the switching element and of the input unit.

12. The method in accordance with claim 11, wherein, following the switching on or switching off of the switching element respectively, the control unit determines an error of the switching element or of the input unit respectively, when a signal level, a status indication of the switching element and/or of the input unit remains unchanged.

* * * * *